(12) United States Patent
Costlow et al.

(10) Patent No.: US 10,967,673 B2
(45) Date of Patent: *Apr. 6, 2021

(54) TIRE WITH TENSIONED SPOKES

(71) Applicant: Bridgestone Americas Tire Operations, LLC, Nashville, TN (US)

(72) Inventors: Douglas B. Costlow, Akron, OH (US); Andrew V. Haidet, Silver Lake, OH (US); Adam K. Nesbitt, Akron, OH (US); Sharon E. Reinhardt, Fairlawn, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,359

(22) Filed: Jun. 9, 2020

(65) Prior Publication Data

US 2020/0298616 A1 Sep. 24, 2020

Related U.S. Application Data

(63) Continuation of application No. 15/845,576, filed on Dec. 18, 2017, now Pat. No. 10,723,170.

(Continued)

(51) Int. Cl.
*B60B 1/02* (2006.01)
*B60B 19/00* (2006.01)
(Continued)

(52) U.S. Cl.
CPC ............. *B60B 1/0261* (2013.01); *B60B 1/04* (2013.01); *B60B 5/02* (2013.01); *B60B 9/26* (2013.01);
(Continued)

(58) Field of Classification Search
CPC ......... B60B 1/0261; B60B 19/00; B60B 9/26; B60B 5/02; B60B 1/04; B60B 1/0269; B60B 2900/351; B60B 1/0276; B60C 7/18
(Continued)

(56) References Cited

U.S. PATENT DOCUMENTS

| 1,098,028 A | 5/1914 | Fahrney |
| 1,366,619 A | 1/1921 | Winders |

(Continued)

FOREIGN PATENT DOCUMENTS

| GB | 10998 A | 11/1914 |
| KR | 20130037808 A | 4/2013 |

(Continued)

OTHER PUBLICATIONS

European Search Report; corresponding European Application No. 17206228; dated Apr. 3, 2018.

(Continued)

*Primary Examiner* — S. Joseph Morano
*Assistant Examiner* — Jean W Charleston
(74) *Attorney, Agent, or Firm* — Shaun J. Fox; Bryan J. Jaketic

(57) ABSTRACT

A nonpneumatic tire includes a tread portion, an upper ring, and a plurality of spokes extending radially downward from the upper ring. Each spoke is configured to carry a load while in tension and while in compression. The upper ring and the plurality of spokes are part of a unitary component constructed of a single material. Each spoke terminates at a lower end having a spoke mount with an opening configured to engage a corresponding hub mount. Each spoke is under substantially no tension when the tread portion is not in contact with a ground surface and when each spoke mount is disengaged from its corresponding hub mount. Each (Continued)

spoke is under tension when the tread portion is not in contact with the ground surface and when each spoke mount is engaged with its corresponding hub mount.

20 Claims, 6 Drawing Sheets

Related U.S. Application Data

(60) Provisional application No. 62/437,299, filed on Dec. 21, 2016.

(51) Int. Cl.
   *B60B 1/04* (2006.01)
   *B60B 9/26* (2006.01)
   *B60C 7/18* (2006.01)
   *B60B 5/02* (2006.01)

(52) U.S. Cl.
   CPC ............... *B60B 19/00* (2013.01); *B60C 7/18* (2013.01); *B60B 1/0269* (2013.01); *B60B 1/0276* (2013.01); *B60B 2900/351* (2013.01)

(58) Field of Classification Search
   USPC .......................................................... 301/58
   See application file for complete search history.

(56) References Cited

U.S. PATENT DOCUMENTS

| | | | |
|---|---|---|---|
| 1,465,261 A | 8/1923 | Gerstmayr | |
| 1,627,418 A * | 5/1927 | Starr | .................. B60B 9/26 152/80 |
| 2,022,217 A | 11/1935 | Rimailho | |
| 2,282,638 A | 5/1942 | Boyer et al. | |
| 4,782,875 A | 11/1988 | Jones | |
| 6,170,544 B1 | 1/2001 | Hottebart et al. | |
| 6,615,885 B1 * | 9/2003 | Ohm | .................. B60B 9/26 152/11 |
| 7,013,939 B2 | 3/2006 | Rhyne et al. | |
| 7,418,988 B2 | 9/2008 | Cron et al. | |
| 7,631,947 B2 | 12/2009 | Mercat et al. | |
| 7,950,747 B2 | 5/2011 | Mercat et al. | |
| 2011/0272254 A1 | 11/2011 | Anderfaas | |
| 2012/0234444 A1 | 9/2012 | Palinkas et al. | |
| 2013/0214586 A1 | 8/2013 | Kismart et al. | |
| 2014/0367007 A1 | 12/2014 | Thompson | |
| 2015/0174953 A1 * | 6/2015 | Cron | .................. B60C 7/18 152/11 |

FOREIGN PATENT DOCUMENTS

| | | |
|---|---|---|
| WO | 2011025491 | 3/2011 |
| WO | 2012171055 | 12/2012 |
| WO | 2015058181 | 4/2015 |
| WO | 2017116475 | 7/2017 |
| WO | 2017117587 | 7/2017 |

OTHER PUBLICATIONS

European Search Opinion; corresponding European Application No. 17206228; dated Apr. 3, 2018.

European Search Report; corresponding European Application No. 20155605; dated Apr. 24, 2020.

European Search Opinion; corresponding European Application No. 20155605; dated Apr. 24, 2020.

* cited by examiner

TIRE WITH TENSIONED SPOKES

CROSS-REFERENCE TO RELATED APPLICATIONS

This application is a continuation of U.S. patent application Ser. No. 15/845,576, filed on Dec. 18, 2017, which claims the benefit of priority of U.S. Provisional Application No. 62/437,299, filed on Dec. 21, 2016, each of which is incorporated herein by reference in its entirety.

FIELD OF INVENTION

The present disclosure relates to a tire having spokes. More particularly, the present disclosure relates to a non-pneumatic tire having a plurality of spokes under a tensile stress.

BACKGROUND

Various tire constructions have been developed which enable a tire to run in an uninflated or underinflated condition. "Run flat tires" may continue to operate after being punctured and experiencing a complete or partial loss of pressurized air for extended periods of time and at relatively high speeds. Non-pneumatic tires do not require inflation and may be particularly useful in off-road applications and in locations where it would be difficult to repair or replace a tire. Some known non-pneumatic tires include a plurality of spokes extending between an inner hoop and an outer hoop.

SUMMARY

In one embodiment, a method of assembling a nonpneumatic tire and hub includes a step of providing a tire having an upper ring, a tread disposed above the upper ring, and a plurality of spokes extending radially downward from the upper ring. Each spoke is configured to carry a load while in tension and while in compression. The upper ring and the plurality of spokes are part of a unitary component constructed of a single material, and each spoke terminates at a lower end having a spoke mount having an aperture. The method further includes a step of providing a hub having a plurality of hub mounts. Each hub mount corresponds to a spoke mount, wherein each spoke has a first length when the tread is not in contact with a ground surface and when each spoke mount is disengaged from its corresponding hub mount. The method further includes mounting the spoke mounts to the hub mounts in series by inserting each hub mount into an aperture of a spoke mount, such that the length of each spoke is extended to a second length greater than the first length when the tread is not in contact with the ground surface.

In another embodiment, a nonpneumatic tire includes a tread portion, an upper ring, and a plurality of spokes extending radially downward from the upper ring. Each spoke is configured to carry a load while in tension and while in compression. The upper ring and the plurality of spokes are part of a unitary component constructed of a single material. Each spoke terminates at a lower end having a spoke mount with an opening configured to engage a corresponding hub mount. Each spoke is under substantially no tension when the tread portion is not in contact with a ground surface and when each spoke mount is disengaged from its corresponding hub mount. Each spoke is under tension when the tread portion is not in contact with the ground surface and when each spoke mount is engaged with its corresponding hub mount.

In yet another embodiment, a nonpneumatic tire and hub assembly includes a tire having an upper ring, a tread portion disposed about the upper ring, and a plurality of spokes extending radially downward from the upper ring. Each spoke terminates at a lower end having a spoke mount, and each spoke is configured to carry a load while in tension and while in compression. The upper ring and the plurality of spokes are part of a unitary component constructed of a single material. The assembly further includes a hub having a plurality of hub mounts, with each hub mount corresponding to a spoke mount. Each spoke is under substantially no tension when the tread portion is not in contact with a ground surface and when each spoke mount is disengaged from its corresponding hub mount. Each spoke is under tension when the tread portion is not in contact with the ground surface and when each spoke mount is engaged with its corresponding hub mount.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" refers to that portion of the tire that comes into contact with the road under normal inflation and load.

Directions are stated herein with reference to the axis of rotation of the tire. The terms "upward" and "upwardly"

refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

Likewise, the terms "inward" and "inwardly" refer to a general direction towards the axis of rotation, whereas "outward" and "outwardly" refer to a general direction away from the axis of rotation and towards the tread of the tire. Thus, when relative directional terms such as "inner" and "outer" are used in connection with an element, the "inner" element is spaced closer to the axis of rotation of the tire than the "outer" element.

Figure 1:
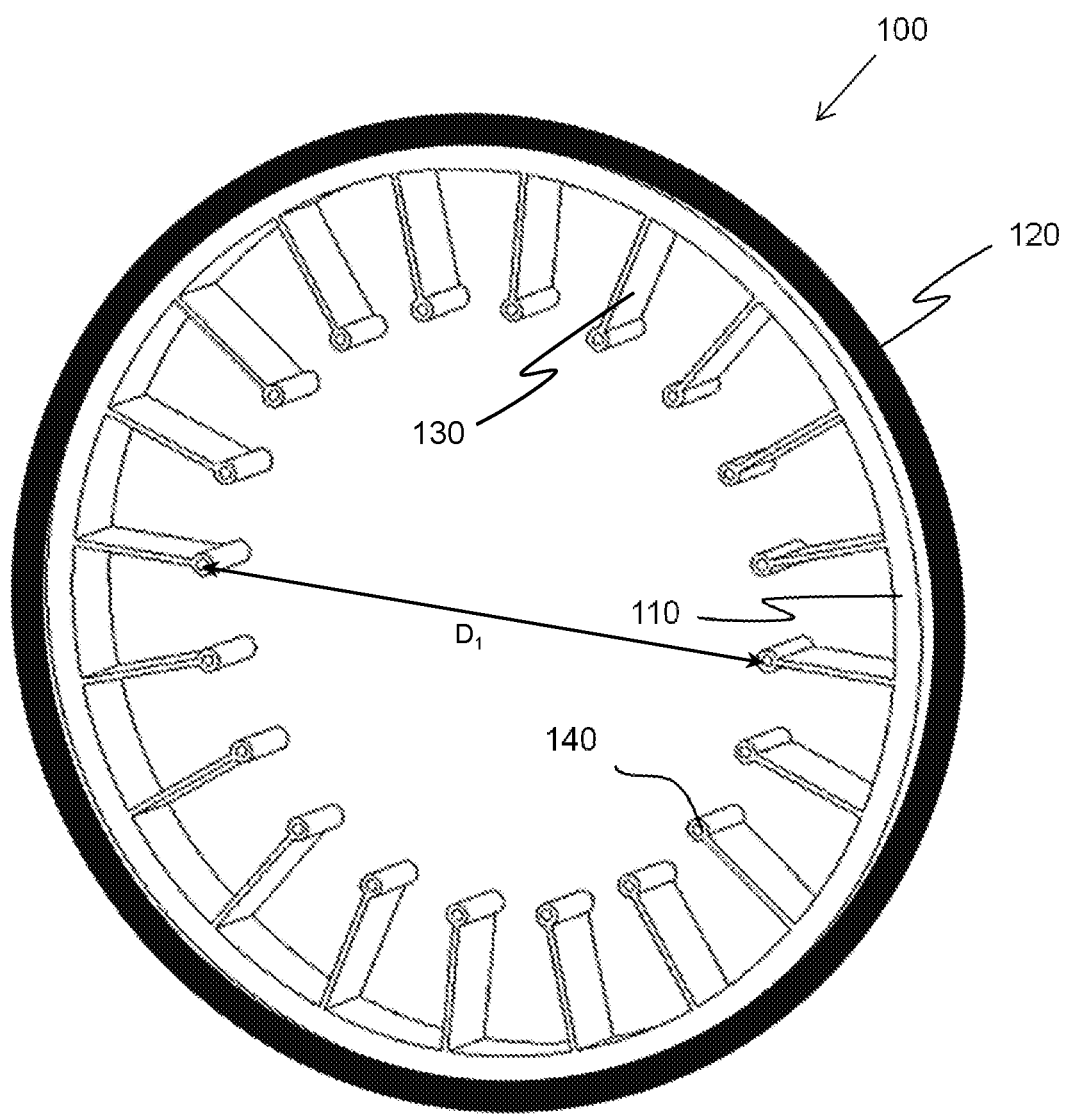
FIG. 1 illustrates a front view of one embodiment of a non-pneumatic tire 100.

FIG. 1 is a front view of one embodiment of a non-pneumatic tire 100. The non-pneumatic tire 100 includes an outer annular band 110 with a tread 120 disposed circumferentially thereon. A plurality of spokes 130 extend inwardly from the outer annular band 110. In the illustrated embodiment, each spoke 130 extends axially below the entire outer annular band 110. In an alternative embodiment, each spoke extends only partially below the outer annular band. In one such embodiment, two or more rows of spokes may be employed. The rows may be aligned with each other or offset from each other.

In the illustrated embodiment, the spokes 130 are substantially linear and extend in a radial direction. In alternative embodiments (not shown), the spokes may be curved or disposed at an acute angle relative to the radial direction. The spokes may also be V-shaped, criss-crossed, or have any geometric shape.

Each spoke 130 terminates at a lower end having a spoke mount 140. The spoke mounts 140 are mounting points disposed along an inner diameter of the tire 100, that may be referred to as the diameter $D_1$. In the illustrated embodiment, each spoke mount 140 is a circular aperture that can receive a fastener such as a pin, a post, a tab, or a threaded rod. The circular aperture may be smooth or it may be threaded. In an alternative embodiment (not shown), the spoke mount is a slot. In another alternative embodiment (not shown) the spoke mount is a projection, such as a pin, a post, a tab, or a threaded rod.

In the illustrated embodiment, the outer annular band 110 and the spokes 130 are part of a unitary component constructed of a single material. For example, the outer annular band 110 and the spokes 130 may be constructed of a polymeric material, such as polyurethane, polyester, or thermoplastic. The outer band and the spokes may also be constructed of one or more resins, or a metal, such as steel. In such embodiments, the outer annular band 110 and the spokes 130 may be constructed as a single, unitary component through a casting, molding, or additive manufacturing process.

In an alternative embodiment, the outer annular band 110 and the spokes 130 are separate components constructed of different materials. In one known embodiment, the outer annular band 110 is constructed of a polymeric material, such as polyurethane, polyester, or thermoplastic. The outer annular band 110 may also be constructed of resin or a metal, such as steel. In one embodiment, the spokes 130 are constructed of a polymeric material, such as polyurethane, and the outer annular band is constructed of a resilient material, such as rubber. The outer annular band 110 and the spokes 130 may also include embedded reinforcements. In an alternative embodiment, the outer annular band 110, spokes 130, and tread 120 are all constructed of a resilient material, such as rubber, and the outer annular band 110 and spokes 130 also include embedded reinforcements.

In the illustrated embodiment, the tread 120 is a separate rubber component disposed about the outer annular band 110. The tread 120 may include ribs, blocks, grooves, sipes, or other tread elements (not shown). The tread 120 may be affixed to the outer annular band 110 with an adhesive. Alternatively, the tread 120 may be affixed to the outer annular band 110 through a curing process or a chemical bonding process.

In an alternative embodiment (not shown) the outer annular band itself forms the tread of tire. As such, it may include ribs, blocks, grooves, sipes, or other tread elements (not shown).

Figure 2:
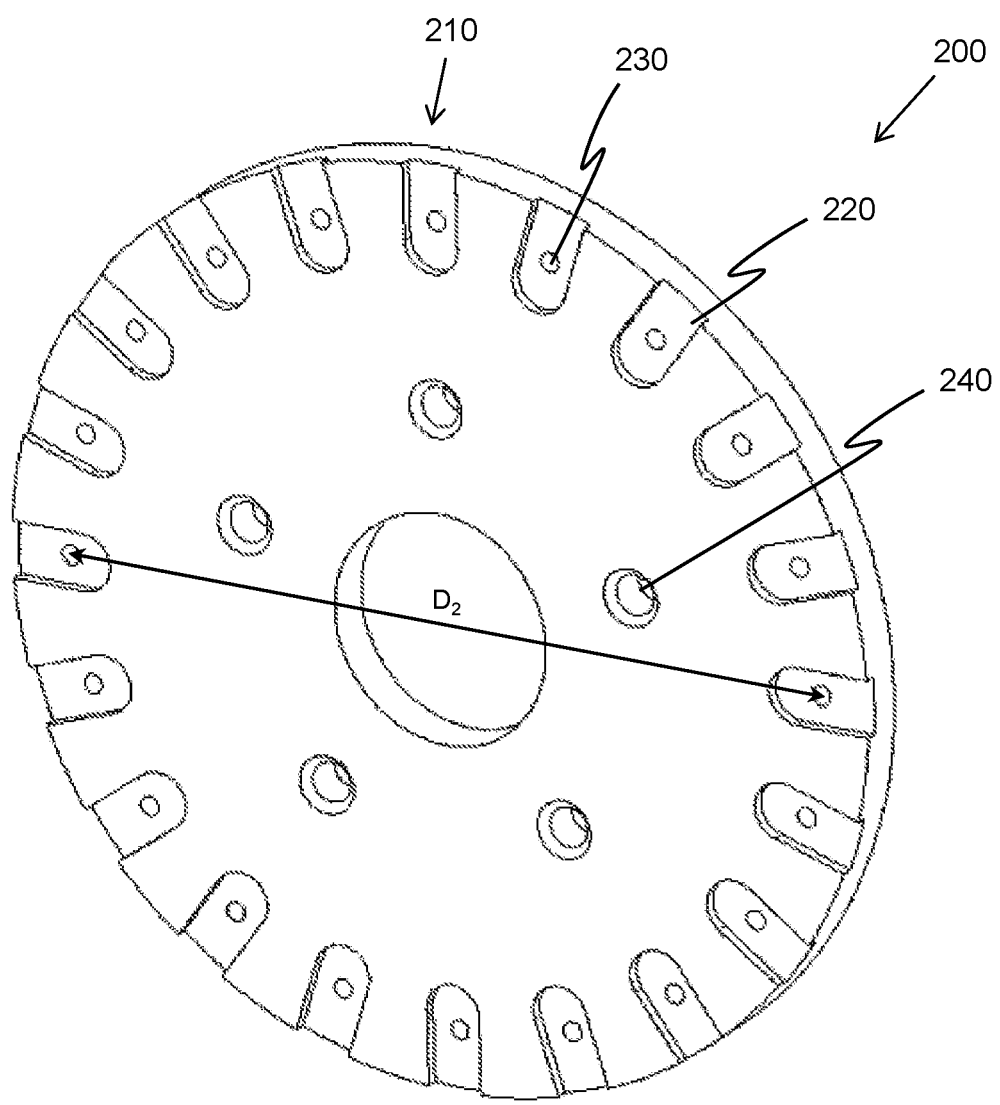
FIG. 2 illustrates a front view of one embodiment of a hub 200.

FIG. 2 is a front view of one embodiment of a hub 200 having a plurality of hub mounts 210 disposed near an outer diameter of the hub. Each hub mount 210 corresponds to a spoke mount 140. In the illustrated embodiment, the each hub mount 210 includes a recessed portion 220 having a stilted arch shape. In an alternative embodiment (not shown), the recessed portion may be omitted.

Each hub mount 210 further includes a circular aperture 230 that can receive a fastener such as a pin, a post, a tab, or a threaded rod. The circular apertures 230 are disposed in a circular arrangement, at a second diameter $D_2$. The second diameter $D_2$ is smaller than the first diameter $D_1$ of the spoke mounts. The circular apertures may be smooth or threaded. In an alternative embodiment (not shown), the hub mount includes a slot instead of a circular aperture. In another alternative embodiment (not shown) the spoke mount is a projection, such as a pin, a post, a tab, or a threaded rod.

The hub 200 further includes a plurality of wheel mounts 240 configured to receive fasteners to affix the hub to a vehicle. While the illustrated embodiment shows a large central aperture and five smaller apertures, it should be understood that any mounting configuration may be employed.

In one known embodiment, the hub 200 is constructed of a polymeric material, such as polyurethane, polyester, or thermoplastic. The hub 200 may also be constructed of resin or a metal, such as steel or aluminum.

Figure 3:
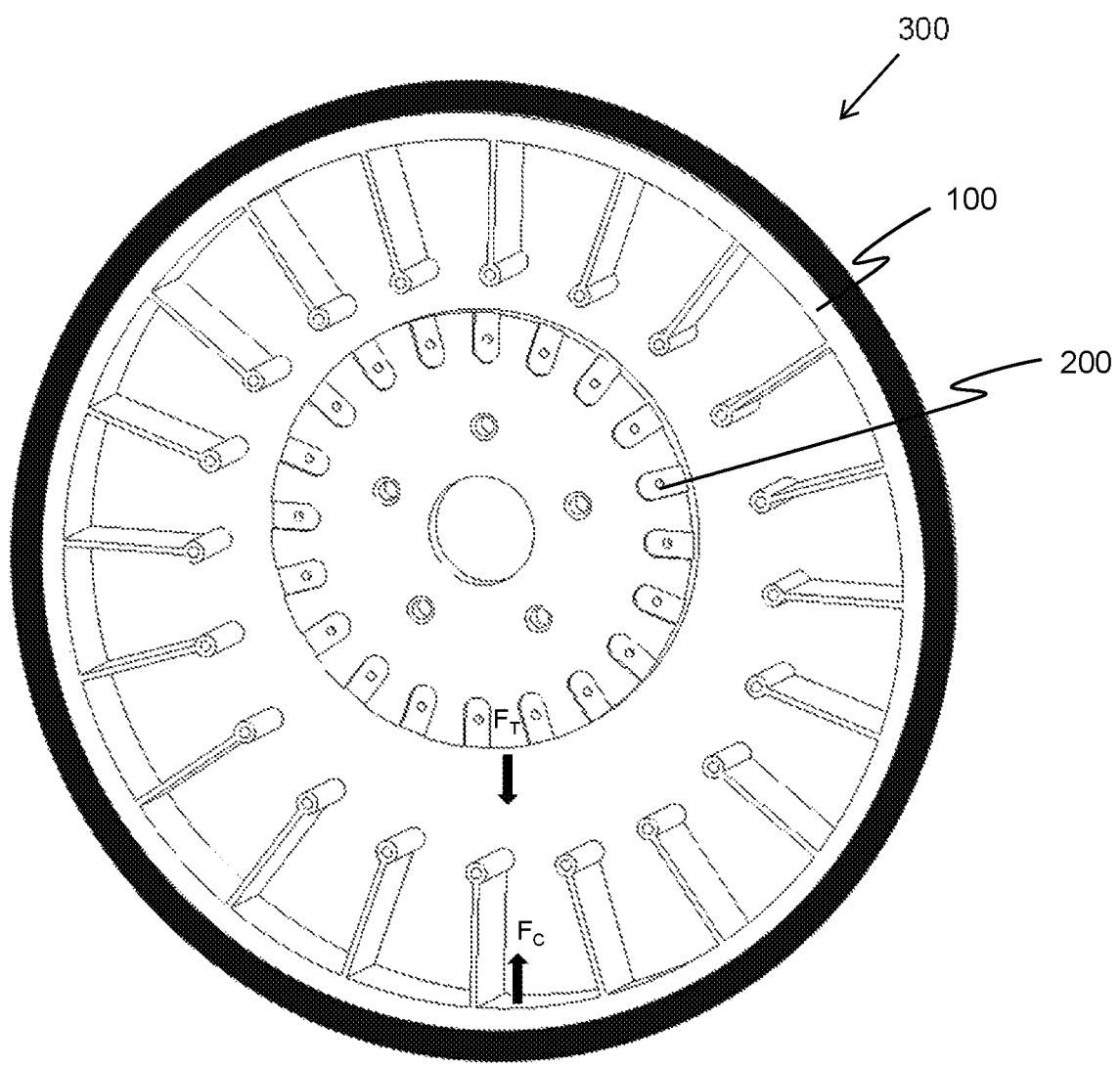
FIG. 3 illustrates a front view of an assembly 300 of the non-pneumatic tire 100 and the hub 200.

FIG. 3 is a front view of an assembly 300 of the non-pneumatic tire 100 and the hub 200 in a partially assembled state. In this illustration, a first spoke mount 140 is aligned with a first circular aperture 230 of a first hub mount 210. The first spoke mount 140 is then attached to the first hub mount 210 with a fastener, such as a pin, post, threaded rod, rivet, bolt, screw, or other known fastener.

Because the spoke mounts 140 are arranged about a first diameter $D_1$, and the circular apertures 230 of the hub mounts 210 are arranged about a second diameter $D_2$ that is smaller than the first diameter $D_1$, the remaining spoke mounts 140 are spaced apart from their corresponding hub mounts 210. Thus, to assemble the non-pneumatic tire 100 and the hub 200 a tensile force $F_T$ must be applied to the hub 200, or a compression force $F_C$ must be applied to the tire 100 to align the spoke mounts 140 and hub mounts 210. After an appropriate force is applied, each spoke mount 140 can be attached to its corresponding hub mount 210.

Thus, when the tire 100 and hub 200 are fully assembled, each of the spokes 130 is in tension. The tension stretches or lengthens the spokes 130. In other words, each spoke 130 has a first length when the tread 120 is not in contact with a ground surface and when each spoke mount 140 is disengaged from its corresponding hub mount 210. Additionally, each spoke 130 has a second length that is greater than the first length when the tread portion 120 is not in contact with the ground surface and when each spoke mount 140 is engaged with its corresponding hub mount 210. Thus, the first diameter $D_1$ is larger than the second diameter $D_2$ when each spoke mount 140 is disengaged from its corresponding hub mount 210, but the first diameter $D_1$ is equal to the second diameter $D_2$ when each spoke mount 140 is engaged with its corresponding hub mount 210.

Likewise, each spoke 130 is under substantially no tension when the tread 120 is not in contact with the ground surface and when each spoke mount 140 is disengaged from its corresponding hub mount 210. Additionally, each spoke 130 is under tension when the tread 120 is not in contact with the ground surface and when each spoke mount is engaged with its corresponding hub mount.

When the tire and wheel assembly is in contact with the ground surface and in a loaded condition (i.e., bearing a portion of the weight of a vehicle), at least some of the spokes 130 below an axis of the tire may be in compression and at least some of the spokes 130 above the axis may be in tension. In one embodiment, each spoke 130 carries a load while in compression and also while in tension. The load carried under compression may be much smaller than the load carried in compression. In an alternative embodiment, each spoke only carries a load while in tension. In one embodiment, the spokes are stiffer in tension than in compression.

The spokes 130 may buckle under compression, depending on the size of the load, the material and geometry of the spokes, and other factors. If buckling occurs, the spokes 130 may not carry a load.

Figure 4A:
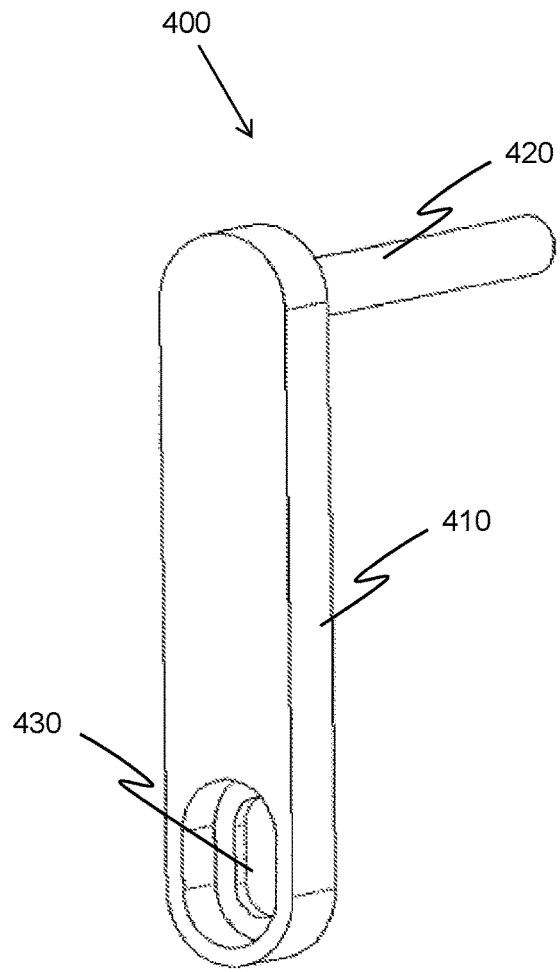
FIGS. 4A and 4B illustrate front and back perspective views of one embodiment of a spoke connecting member.
Figure 4B:
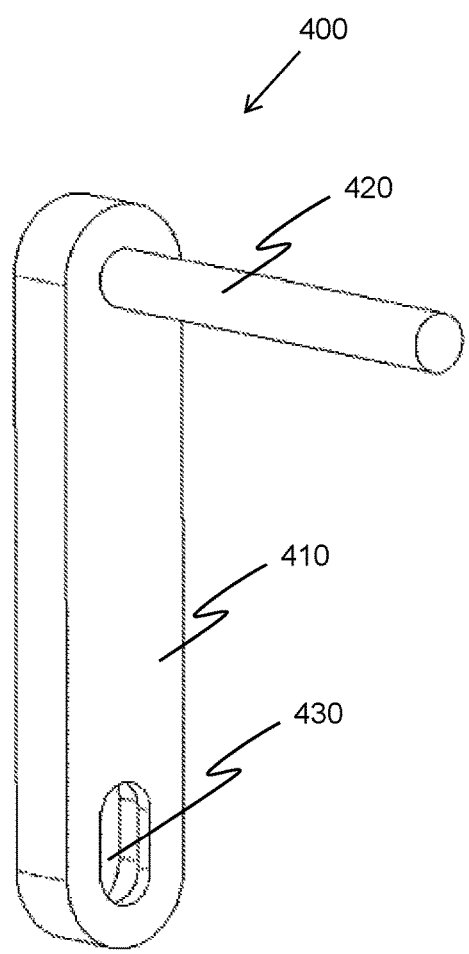

FIGS. 4A and 4B are front and back perspective views, respectively, of one embodiment of a spoke connecting member 400. In the illustrated embodiment, the spoke connecting member 400 includes a main body 410 having a first end and a second end. A post 420 projects from the first end, which can be received by either a spoke mount or a hub mount. In the illustrated embodiment, the post 420 is a smooth projecting member. Such a post may be received in an aperture and retained by a pin or a clamp.

In an alternative embodiment, at least a portion of the post is threaded. A threaded post may be received in a threaded aperture or a smooth aperture. If a threaded post is received in a smooth aperture, it may be retained by a pin, clamp, or a threaded nut. In another alternative embodiment (not shown), the first end of the main body includes an aperture, such as a circular aperture or a slot. Such an aperture may receive a fastener.

The body 410 of the connecting member 400 further includes a slot 430 disposed in the second end. The slot 430 is configured to receive a fastener to connect the connecting member 400 to a spoke mount or a hub mount. In an alternative embodiment (not shown), the second end of the connecting member has a circular aperture. In another alternative embodiment (not shown), the second end of the connecting member has a projection, such as a post, tab, pin, or threaded rod.

The connecting member 430 may be constructed of a polymeric material, such as polyurethane, polyester, or thermoplastic. The connecting member 430 may also be constructed of resin or a metal, such as steel. The connecting member 430 may also include embedded reinforcements. In one embodiment, the connecting member 430 is constructed of the same material as the spokes of a non-pneumatic tire.

In an alternative embodiment, the connecting member 430 and the spokes are constructed of different materials.

Figure 5:
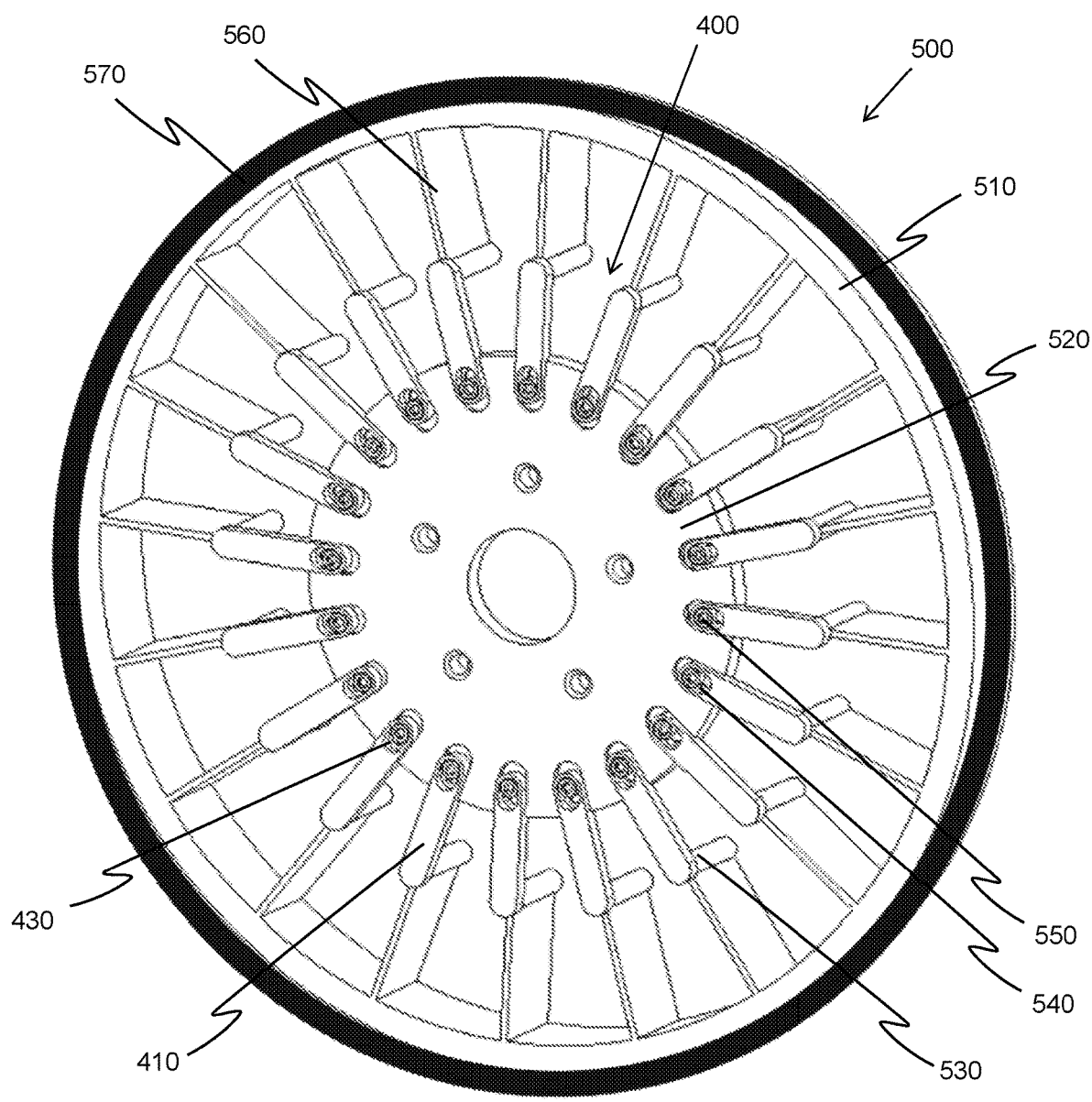
FIG. 5 illustrates a front view of an alternative embodiment of an assembly 500 of a hub and a non-pneumatic tire having spoke connecting members.

FIG. 5 is a front view of an alternative embodiment of an assembly 500 of a non-pneumatic tire 510 and a hub 520 having spoke connecting members 400. The non-pneumatic tire 510 and hub 520 are substantially similar to the non-pneumatic tire 100 and the hub 200 described above, except the spoke mounts 530 are spaced further away from the hub mounts 540. Thus, the spoke connecting members 400 are used to connect the spoke mounts 530 to the hub mounts 540.

In the illustrated embodiment, each spoke mount 530 receives a post 420 of the first end of the main body 410 of a spoke connecting member 400. The post 420 may be fastened to the spoke mount 530 via threads or a fastener, in the manner described above.

The slot 430 of the second end of the main body 410 of each spoke connecting member 400 is then aligned with a corresponding hub mount 540. As a radially inward force is applied to each spoke connecting member 400, the spoke connecting member 400 is connected to the hub mount 540 with a fastener 550. In the illustrated embodiment, the fastener 550 is a bolt. In alternative embodiments (not shown), the fastener may be a pin, post, screw, rivet, or other fastener.

The radially inward force on each spoke connecting member 400 is transferred to each corresponding spoke 560 of the non-pneumatic tire 510. Therefore, when the tire 510 and wheel 520 are assembled, the radially inward force stretches or lengthens the spokes 560. As with the embodiment discussed above with respect to FIG. 3, each spoke 560 has a first length when a tread 570 is not in contact with a ground surface and when each spoke mount 530 is disengaged from its corresponding hub mount 540. Additionally, each spoke 560 has a second length that is greater than the first length when the tread portion 570 is not in contact with the ground surface and when each spoke mount 530 is engaged with its corresponding hub mount 540 via the spoke connecting member 400.

Likewise, each spoke 560 is under substantially no tension when the tread 570 is not in contact with the ground surface and when each spoke mount 530 is disengaged from its corresponding hub mount 540. Additionally, each spoke 560 is under tension when the tread 570 is not in contact with the ground surface and when each spoke mount 530 is engaged with its corresponding hub mount 540 via the spoke connecting member 400.

The spoke connecting members 400 are rigid members in the illustrated embodiment. In alternative embodiments (not shown), the spoke connecting members are non-rigid spoke connecting members. Examples of non-rigid spoke connecting members include, without limitation, cables, cords, string, and mesh.

While the assembly 500 is described as including a tire 510, a hub 520 and a plurality of connecting members 400, it should be understood that this terminology is used for convenience. Instead of referring to "spoke connecting members," the assembly 500 may also be described as having spokes that are formed by a first spoke component mechanically connected to a second spoke component. In alternative embodiments (not shown), the spokes may be formed of three or more spoke components or attached to two or more spoke connecting members.

Figure 6:
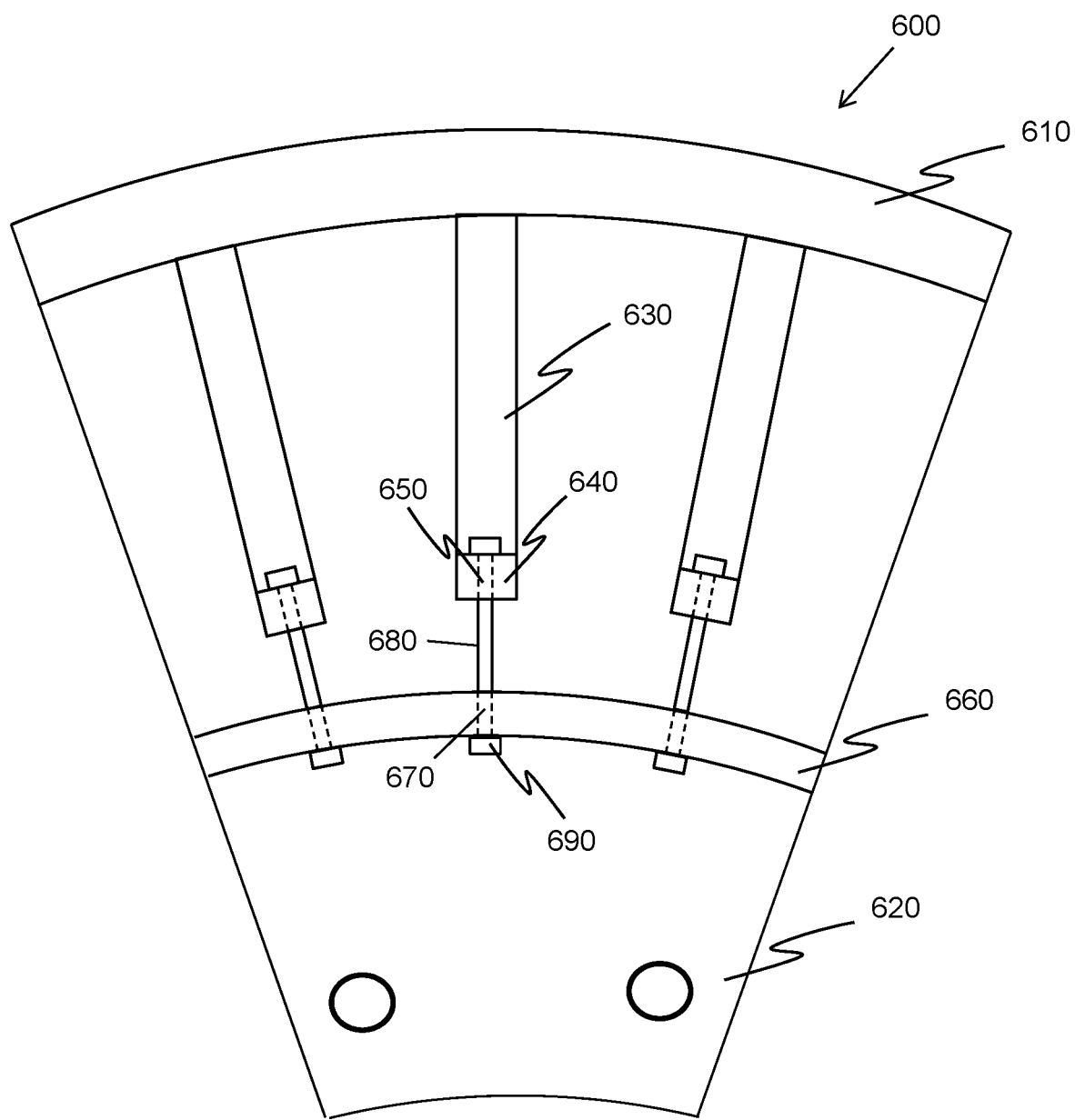
FIG. 6 illustrates a partial front view of another alternative embodiment of an assembly 600 of a hub and a non-pneumatic tire.

FIG. 6 is a partial front view of another alternative embodiment of an assembly 600 of a non-pneumatic tire 610 and a hub 620. The non-pneumatic tire 610 and hub 620 are substantially similar to the non-pneumatic tires 100, 510 and hubs 200, 520 described above, except for the differences described herein. In the prior examples, the spoke mounts and hub mounts included apertures that received fasteners inserted in a substantially axial direction. In the illustrated embodiment, each spoke 630 includes a flange 640 that extends from the spoke in an axial direction. Each flange 640 includes an aperture 650 extending through the flange in a substantially radial direction. In an alternative embodiment (not shown), the apertures extend at an acute angle with respect to the radial direction. While the illustrated embodiment includes a plurality of flanges, in an alternative embodiment, a single annular flange may extend circumferentially, such that it is connected to multiple spokes.

With continued reference to FIG. 6, the hub 620 includes a flange 660. The flange 660 includes a plurality of apertures 670 that correspond to the apertures 650 in the spoke flanges 640. The apertures 670 in the hub flange 660 also extend in the radial direction. In an alternative embodiment (not shown), the apertures extend at an acute angle with respect to the radial direction. While the illustrated embodiment includes a single annular flange, in an alternative embodiment, a plurality of flanges may be employed.

A spoke connecting member 680 extends from the spoke flange 640 to the hub flange 660. In the illustrated embodiment, the spoke connecting member 680 is a bolt that extends through the apertures 650, 670 of the spoke flange 640 and the hub flange 660. The bolt 680 has a threaded end that receives a nut 690. The nut 690 may be tightened to apply a tensile force through the bolt 680 to the corresponding spoke 630. Therefore, when the tire 610 and wheel 620 are assembled, the tensile force stretches or lengthens the spokes 630. As with the embodiments discussed above with respect to FIGS. 3 and 5, each spoke 630 has a first length when a tread (not shown) is not in contact with a ground surface and when each spoke flange 640 is disengaged from the hub flange 660. Additionally, each spoke 630 has a second length that is greater than the first length when the tread is not in contact with the ground surface and when each spoke flange 640 is engaged with the hub flange 660 via the spoke connecting member 680.

In the illustrated embodiment, the spoke connecting members 680 are rigid members. In alternative embodiments (not shown), the spoke connecting members are non-rigid members. Examples of non-rigid spoke connecting members include, without limitation, cables, cords, string, and mesh.

In one embodiment, tension on the spokes may be adjusted. For example, the tension may be actively adjusted based on the desired performance of the tire. The adjustments made to the tension may be accomplished through mechanical, electrical, pneumatic, hydraulic, or magnetic energy. Components such electric motors or solenoids, pneumatic or hydraulic cylinders, or permanent magnets or electro-magnets may be employed to adjust the tension of one or more spokes. Any one of these components could be attached between the hub and spoke connecting member to allow for adjustment of the tension.

The adjustments made to the tension may be made over short or long periods of time. For example, the tension may be adjusted for a fraction of a single rotation of a tire. Alternatively, the tension may be adjusted for several rotations of the tire or even for the entire life of the tire. Multiple adjustable wheel portions may be used to hold one or more spokes to a center hub, and each portion may be adjusted differently based on need. Variation in spoke tension can serve to adjust uniformity or the roundness of the tire. The tension may be varied statically (i.e., while the tire is at rest) or dynamically (i.e., while the tire is rotating). Dynamic variation of the tension may improve braking or traction performance of the tire.

A controller may be employed to adjust the tension of the spokes. Such a controller may adjust the tension on multiple spokes simultaneously, or it may adjust the tension of a single spoke. In one known embodiment, the controller may adjust the tension on a spoke when the tread portion is in contact with the ground surface and the tire is rotating. In such an embodiment, the tension of the spokes may be optimized for specific road or ground conditions, weather conditions, vehicle speed, or driver performance.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A method of assembling a nonpneumatic tire and hub, the method comprising:
    providing a tire including:
        an upper ring,
        a tread disposed above the upper ring, and
        a plurality of spokes extending radially downward from the upper ring, each spoke being configured to carry a load while in tension and while in compression, wherein the upper ring and the plurality of spokes are part of a unitary component constructed of a single material, and wherein each spoke terminates at a lower end having a spoke mount having an aperture;
    providing a hub having a plurality of hub mounts, each hub mount corresponding to a spoke mount, wherein each spoke has a first length when the tread is not in contact with a ground surface and when each spoke mount is disengaged from its corresponding hub mount; and
    mounting the spoke mounts to the hub mounts in series by inserting each hub mount into an aperture of a spoke mount, such that the length of each spoke is extended to a second length greater than the first length when the tread is not in contact with the ground surface.

2. The method of claim 1, wherein the spoke mounts include mounting points disposed along a first diameter on the tire.

3. The method of claim 2, wherein the hub mounts include mounting points disposed along a second diameter on the hub.

4. The method of claim 3, wherein the first diameter is larger than the second diameter when each spoke mount is disengaged from its corresponding hub mount, and wherein the first diameter is equal to the second diameter when each spoke mount is engaged with its corresponding hub mount.

5. The method of claim 1, wherein the aperture of the spoke mount is a slot oriented in a radial direction.

6. The method of claim 1, wherein the aperture of the spoke mount is a circular aperture.

7. The method of claim 1, further comprising mechanically connecting a first spoke component to a second spoke component.

8. A nonpneumatic tire comprising:
a tread portion;
an upper ring; and
a plurality of spokes extending radially downward from the upper ring, each spoke being configured to carry a load while in tension and while in compression,
wherein the upper ring and the plurality of spokes are part of a unitary component constructed of a single material,
wherein each spoke terminates at a lower end having a spoke mount with an opening configured to engage a corresponding hub mount,
wherein each spoke is under substantially no tension when the tread portion is not in contact with a ground surface and when each spoke mount is disengaged from its corresponding hub mount, and
wherein each spoke is under tension when the tread portion is not in contact with the ground surface and when each spoke mount is engaged with its corresponding hub mount.

9. The tire of claim 8, wherein each spoke includes a connecting member.

10. The tire of claim 9, wherein the connecting members are rigid members.

11. The tire of claim 9, wherein the connecting members are non-rigid members.

12. The tire of claim 8, wherein at least some of the plurality of spokes are under tension when the tread portion is in contact with a ground surface and when each spoke mount is engaged with its corresponding hub mount.

13. The tire of claim 8, wherein the opening in each spoke mount is a circular aperture.

14. The tire of claim 8, wherein the opening in each spoke mount is a radially oriented slot.

15. The tire of claim 8, further comprising a controller configured to adjust the tension on a spoke when the tread portion is in contact with the ground surface and the tire is rotating.

16. A nonpneumatic tire and hub assembly comprising:
a tire including:
an upper ring,
a tread portion disposed about the upper ring, and
a plurality of spokes extending radially downward from the upper ring, wherein each spoke terminates at a lower end having a spoke mount, each spoke being configured to carry a load while in tension and while in compression, wherein the upper ring and the plurality of spokes are part of a unitary component constructed of a single material; and
a hub having a plurality of hub mounts, each hub mount corresponding to a spoke mount,
wherein each spoke is under substantially no tension when the tread portion is not in contact with a ground surface and when each spoke mount is disengaged from its corresponding hub mount, and
wherein each spoke is under tension when the tread portion is not in contact with the ground surface and when each spoke mount is engaged with its corresponding hub mount.

17. The assembly of claim 15, further comprising a controller configured to adjust the tension on a spoke when the tread portion is in contact with the ground surface and the tire is rotating.

18. The assembly of claim 16, wherein the controller is in communication with a mechanical adjusting component.

19. The assembly of claim 16, wherein the controller is in communication with an electrically powered adjusting component.

20. The assembly of claim 16, wherein the controller is in communication with a pneumatically powered adjusting component.

* * * * *